United States Patent [19]

Tavis

[11] Patent Number: 4,690,004

[45] Date of Patent: Sep. 1, 1987

[54] VARIABLE-RELUCTANCE TRANSDUCER

[76] Inventor: John R. Tavis, 3634 Highway 49, Mariposa, Calif. 95338

[21] Appl. No.: 896,748

[22] Filed: Aug. 14, 1986

[51] Int. Cl.⁴ ............................ G01L 1/14; G01L 9/10
[52] U.S. Cl. .................................. 73/862.64; 73/728; 336/30
[58] Field of Search ...................... 73/862.64, 722, 728, 73/779, 517; 324/208; 336/30, 131; 340/870.35

[56] References Cited

U.S. PATENT DOCUMENTS

| | | | |
|---|---|---|---|
| 2,440,605 | 4/1948 | Hathaway | 336/30 |
| 2,510,073 | 6/1950 | Clark | 340/870.35 X |
| 3,858,443 | 1/1975 | Roberts, III et al. | 73/862.33 |
| 4,255,975 | 3/1981 | Debreville | 73/862.64 X |

Primary Examiner—Charles A. Ruehl
Attorney, Agent, or Firm—Christie, Parker & Hale

[57] ABSTRACT

A four-active-arm variable-reluctance transducer which provides a high-level output signal, enabling detection and measurement of minute variations of the measured parameter while that parameter is at a high level relative to the full-scale performance capability of the transducer.

4 Claims, 7 Drawing Figures

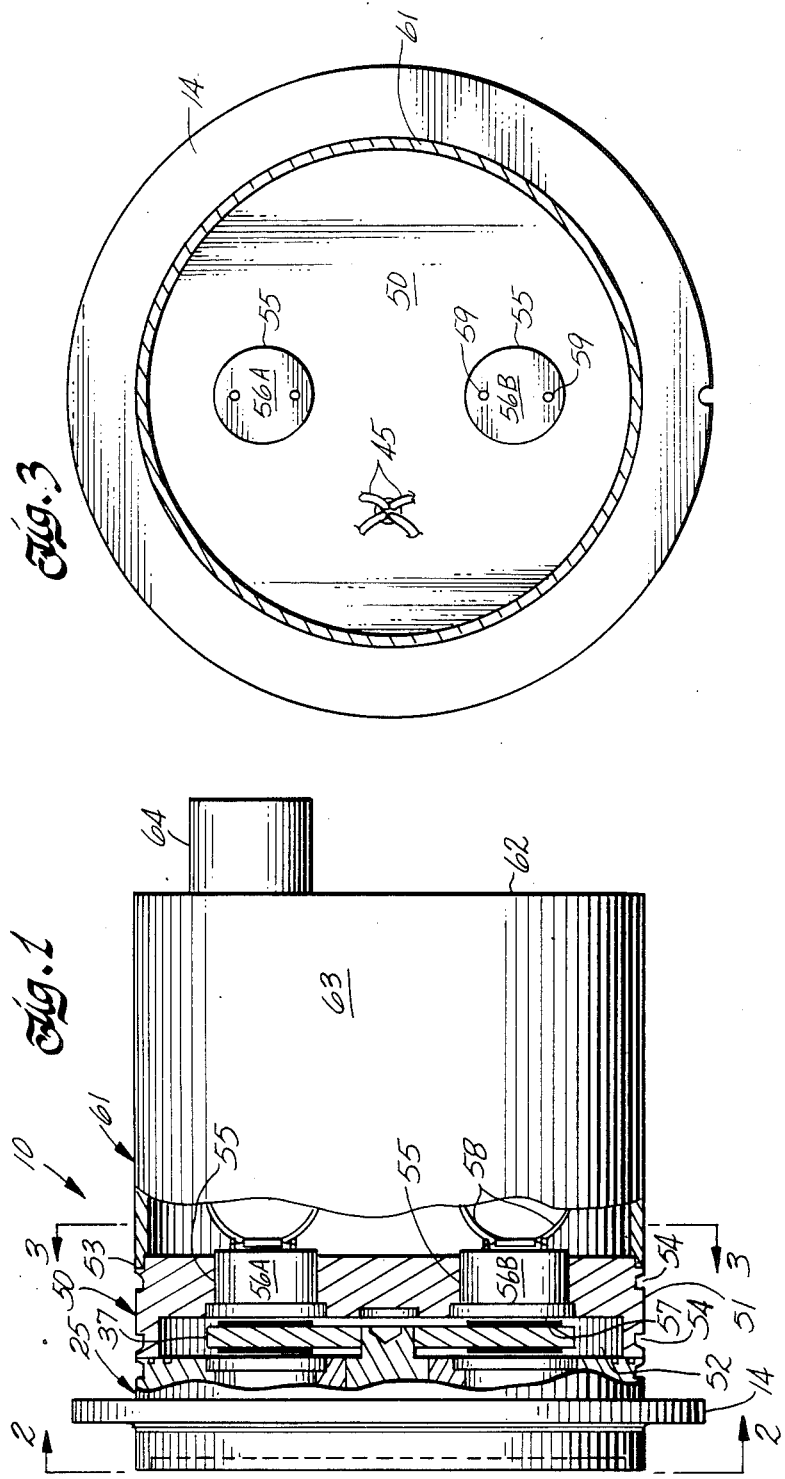

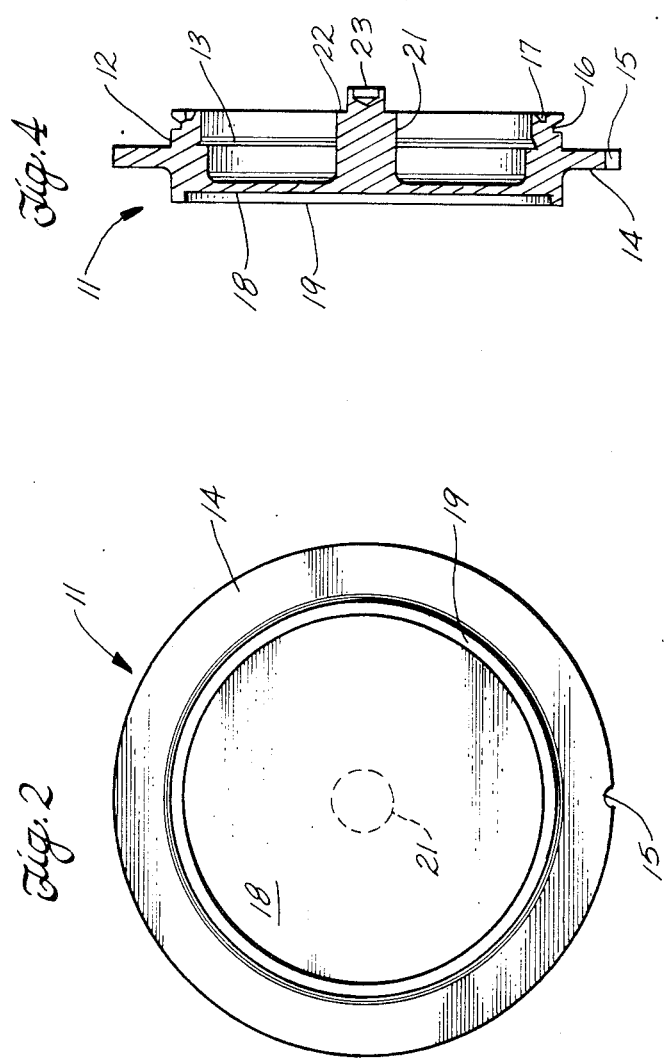

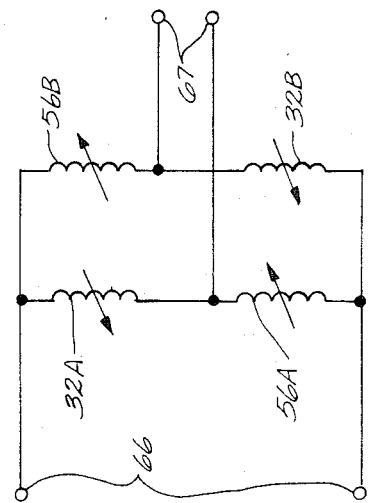
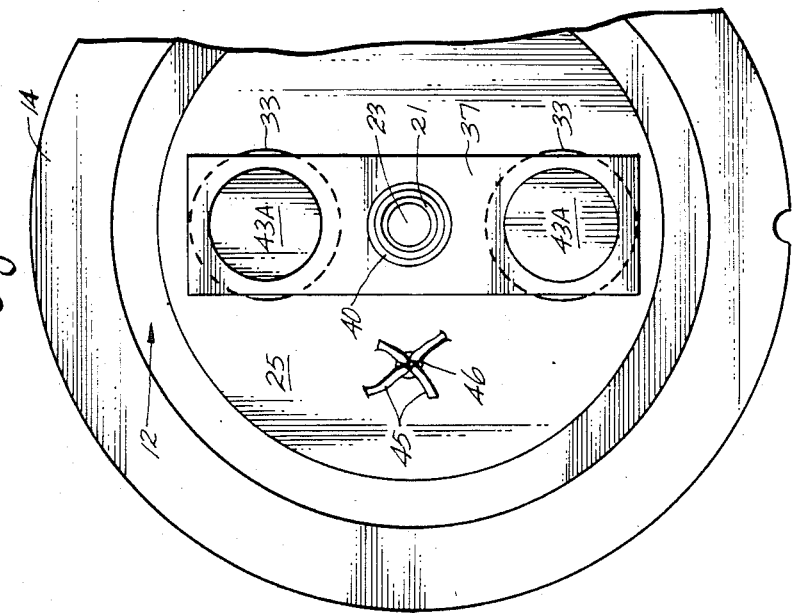
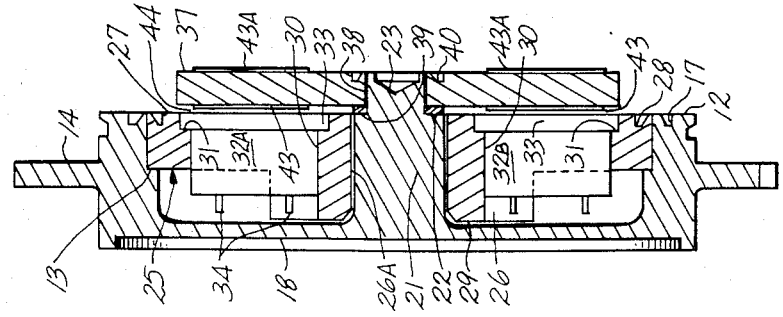

VARIABLE-RELUCTANCE TRANSDUCER

BACKGROUND OF THE INVENTION

Variable-reluctance transducers have been commercially available for many years, and typical known configurations are shown in my U.S. Pat. Nos. 3,118,121, 3,140,450 and 3,562,682 which are directed to pressure measuring instruments. The basic variable-reluctance sensing mechanism, however, measures movement or displacement, and is accordingly adaptable to other kinds of transducers such as accelerometers, vibrometers, and the like. When used in a pressure transducer, a force-summing linearly reacting diaphragm is exposed to the fluid pressure to be measured, and the resulting deflection of the diaphragm displaces the elements of the variable-reluctance system (typically in a bridge configuration) to generate an electrical signal proportional to movement, and hence to pressure. Other force-to-motion converters can also be used, such as the well-known Bourdon tube.

In a typical two-active-arm oscillator-excited Wheatstone-bridge configuration, the variable-reluctance sensor includes a pair of spaced-apart coils, each wound around the center leg of an E-shaped high-permeability core of iron or a similar magnetic material, there being an air gap between the opposed coil-core sets. A magnetic element or armature in the air gap is moved or displaced by the force sensor (e.g., diaphragm, seismic mass, etc.), thereby varying the reluctance of the magnetic circuit by increasing the air gap for one coil, and proportionately decreasing the air gap for the other. This results in proportional and opposite changes of the coil inductances, enabling generation of an electrical signal directly related to the phenomenon (pressure, etc.) being measured.

Variable-reluctance sensors are rugged and generate relatively high output signals (in the order of volts rather than millivolts) as compared to other kinds of sensors such as strain gages. The large output signal simplifies the overall instrumentation system, and provides a good signal-to-noise ratio relative to the noise inherent in the associated electronic circuitry (oscillator, demodulator, and the like). There is nevertheless a problem with these and similar devices when the objective is to measure minute variations of the measured parameter while that parameter is at a high level which is close to or at the full-scale limit of the transducer.

For example, there are pressure-measuring applications where the average pressure level is high (e.g., 250 psi), but there is a need for measuring very small variations (e.g., one-tenth inch of water, or about 0.0036 psi) from this average level. A high-level pressure transducer must be used to withstand the high average or static pressure (which may also be of measurement interest), and the small variation to be monitored results in only a tiny variation in the average output signal. These minute variations become buried in the noise inherent in the measurement system, limiting the ability of the transducer system to provide a useful output signal reflecting the target small pressure changes.

The variable-reluctance transducer of this invention provides a solution to this problem, and is described in terms of a pressure transducer, though the principles of the invention are applicable to accelerometers and other styles of transducers. Broadly, the concept is to provide a variable-reluctance system which generates a very high output signal which lifts the desired small output variations above the relatively constant noise level of the associated electronics so the small output variations can be detected and recorded or displayed.

SUMMARY OF THE INVENTION

The transducer of this invention includes a force-sensing element (such as a diaphragm in a pressure-measuring configuration) which is moved or displaced in direct relation to the measured parameter. A post on the sensor carries at its end a laterally extending arm or beam which extends between two pairs of opposed coil-core elements arranged in a four-active-arm Wheatstone bridge. High-permeability pads on opposite sides of the beam vary the air gaps of the opposed coil-core elements to produce a high-level output signal in response to movement of the sensor, post and beam.

A particular advantage of the invention is that only a small number of precision-machined parts are required. Assembly procedures are also simplified, without loss of precise control over close spacing of the magnetic-circuit elements. Specifically, the dimensions of the air gaps are easily maintained in production, and the beam mounting arrangement enables precise positioning of the beam and armature elements in the gaps.

DESCRIPTION OF THE DRAWINGS

FIG. 1 is a side elevation, partly in section, of a pressure transducer constructed according to the invention;

FIG. 2 is a front axial view of the transducer taken on line 2—2 of FIG. 1;

FIG. 3 is a rear axial view of the transducer, partly in section, and taken on line 3—3 of FIG. 1;

FIG. 4 is a side sectional elevation of a diaphragm assembly for the transducer;

FIG. 5 is a sectional elevation similar to FIG. 4, but showing the diaphragm assembly assembled with further components of the transducer;

FIG. 6 is an axial rear view of the assembly shown in FIG. 5; and

FIG. 7 is a schematic diagram showing the electrical connections of the transducer.

DETAILED DESCRIPTION OF THE PREFERRED EMBODIMENT

A pressure transducer 10 embodying the invention is generally shown in FIGS. 1-3, and it includes an integral diaphragm assembly 11 shown in greater detail in FIGS. 2 and 4. The diaphragm assembly is a circularly symmetrical part machined from a conventional transducer material such as 17-4 PH stainless steel. The assembly includes an outer cylindrical ring 12 having at its inner or rear end an inner recess defining an annular shoulder 13. An integrally machined mounting flange 14 extends radially outward from a central part of ring 12, and the mounting flange has an indexing notch 15. The rear end of the ring includes several annular grooves 16 and 17 for stress relief of ring 12 when other components (described below) are welded to the ring.

An integral diaphragm 18 extends across the front of the ring. In some applications, it may be desirable to recess the diaphragm slightly from the front of the ring, and this construction is shown in FIG. 4 as a narrow annular rib 19 extending slightly forwardly from the outer perimeter of the diaphragm. An integrally formed cylindrical post 21 extends rearwardly from the center of the inner surface of diaphragm 18 and the rear portion of the post is inwardly stepped to define a shoulder 22. A weld-stress-relief bore 23 is formed in the inner end of the post.

Referring to FIGS. 5 and 6 which show the next step in assembling transducer 10, a circularly symmetrical inner mounting ring 25 has an integral inner hub 26 with a central bore 26A extending therethrough so the hub makes a clearance fit over the large-diameter portion of post 21 (FIG. 5). The radially outer part of the mounting ring is reduced in thickness to define an outwardly extending mounting flange 27 making a snug fit within the rear portion of the diaphragm cavity to bottom on shoulder 13. This shoulder is slightly undercut (FIG. 4) to insure a perfectly flat locating surface for flange 27.

A stress-relief annular groove 28 is formed in the rear surface of flange 27, and the flange is welded to outer cylindrical ring 12 of the diaphragm assembly at the mating surface of these parts between annular grooves 17 and 28. A forward end 29 of hub 26 is spaced slightly rearwardly of the inner surface of diaphragm 18 to provide an overpressure stop for the diaphragm.

Two cylindrical bores 30 are formed through inner mounting ring 25 at 180-degree spacing on opposite sides of the axial center line of the ring, and each bore has at its rear end an outwardly extending mounting shoulder 31. A pair of cylindrical magnetic-core sensors 32 are fitted snugly in the bores 30, and each sensor has an outwardly extending flange 33 at its rear end which abuts annular shoulder 31. The core housings are metallic, and are welded to the inner mounting ring.

Each sensor has a pair of wiring terminals 34 on the surface facing the transducer diaphragm, and these terminals are connected to a coil within the sensor housing. Sensors 32 are of a conventional type having a core of magnetic material, and a coil wound around the core. Sensors of this type are described in greater detail in U.S. Pat. No. 3,562,687, the disclosure of which is incorporated herein by reference.

A generally rectangular wand-like plate or beam 37 (FIGS. 5 and 6) has a central bore 38 which snugly receives the reduced-diameter rear part of post 21 of the diaphragm assembly. As shown in FIG. 5, the front surface of the beam is spaced slightly from the active surfaces of magnetic-core sensors 32, and this spacing is achieved by a washer-like shim 39 between beam 37 and shoulder 22 of the post. A stress-relief annular groove 40 is formed in the rear surface of the beam around central bore 38, and the beam and post are welded together at the surface between post bore 23 and groove 40.

Two circular shim-like magnetic pads 43 are flush welded to the front surface of beam 37 in alignment with the sensitive surfaces of adjacent sensors 32, and the pads are made of a soft magnetic material (Hy Mu 80 is satisfactory) having a thickness of perhaps 0.005 to 0.006 inch. The diameter of each pad corresponds generally to the sensitive surface of the adjacent sensor, and is typically about 0.4 inch. The relative spacing of these parts is such that an air gap 44 exists between each magnetic pad and the associated sensor as is conventional in variable-reluctance transducers.

A second pair of magnetic pads 43A (identical to pads 43) are mounted at 180-degree spacing on opposite sides of the axial centerline of beam 37 on the rear surface of the plate. As previously described, pads 43A are thin circular disks of magnetic material which are centrally welded to the beam. As shown in FIG. 6, connecting wires 45 from terminals 34 on the inner sensors pass rearwardly through an opening 46 in inner mounting ring 25 and radially spaced apart from beam 37.

Referring again to FIGS. 1 and 3, a generally cylindrical rear mounting ring has a forwardly extending annular flange 51 which is welded to the rear surface of inner mounting ring 25. Flange 51 defines a cavity 52 with the front surface of ring 50 to provide clearance space for beam 37 as shown in FIG. 1. The rear surface of ring 50 is radially inwardly stepped to define a shoulder 53, and stress-relief annular grooves 54 are formed in the periphery of the ring.

A pair of bores 55 extend through rear mounting ring 50 at 180-degree spacing on opposite sides of the ring axial centerline, and a second pair of magnetic-core sensors 56 are snugly fitted in the bores and welded to the ring. Sensors 56 are identical to sensors 32 previously described, and air gaps 57 are defined between the sensitive surfaces of sensors 56 and adjacent magnetic pads 43A on beam 37. Connecting leads 58 extend from terminals 59 on the sensors.

The assembly is completed by a hollow cylindrical housing 61 having a rear wall 62 and a cylindrical shell-like body 63, the forward end of which abuts shoulder 53 on inner mounting ring 50 to be welded to the mounting ring. The cavity within housing 61 encloses miniaturized electronic assemblies (not shown) of a conventional type, and an input-output connector 64 is provided on rear wall 62. The electronic assemblies typically include an oscillator to provide an a-c excitation voltage (two volts rms at 25 kHz is typical) to the magnetic core sensors, and a demodulator to process the transducer output signal.

An electrical schematic of the transducer is shown in FIG. 7, and the sensor-pad pairs are illustrated as variable-reluctance elements 32AB and 56AB, the reluctance of which varies depending upon the spacing of the pad and sensor. In other words, variations in the air gap between the pad and associated sensor cause variations in the reluctance of each element. The four elements are preferably connected in a four-arm Wheatstone bridge configuration, with the input or excitation voltage being appled between terminals 66, and the output voltage appearing between output terminals 67. The specific connection arrangement shown in FIG. 7 is preferred because it is responsive only to linear movement of beam 37, and rotation of the beam (which may occur in environments of high vibration or acceleration) does not introduce an error in the output signal because the inductive variations are self-cancelling.

Preferably, all of the machined metal components of the transducer are made of identical material (17-4 PH stainless steel is satisfactory as mentioned above) to minimize thermal effects on the transducer. Although various attachment methods may be used to secure the transducer components together, TIG (tungsten inert gas) welding is the preferred assembly method.

In operation, fluid pressure is applied to the front surface of diaphragm 18, resulting in diaphragm deflection which is transmitted by post 21 to beam 37, thereby varying the air gaps between the magnetic pads and associated sensors. As is apparent from the drawings, two of the gaps increase, and the gaps on the opposite face of the pad beam decrease, thereby providing the maximum possible output signal from the four-active-arm Wheatstone bridge configuration shown schematically in FIG. 7. The use of four active sensing elements, coupled with closely controlled minimum spacing between each sensor and the associated magnetic pad, provides unusually high sensitivity for the transducer, and a full-scale output voltage of about one-half volt per volt of excitation is typical.

As mentioned above, the significance of this high output voltage is that very small pressure changes can be detected at high line pressures because the resulting small signal variations are significantly greater than the inherent minimum noise level in the associated electronics. In units which have been tested, small pressure variations of about one-tenth inch of water are measurable when the transducer is exposed to a high line pressure of about 250 psi.

In the configuration described, the transducer typically operates as either a sealed-gage or absolute measuring device, depending on whether the internal volume of the transducer is sealed at one atmosphere, or evacuated. The transducer is also useful, however, as a differential pressure transducer (with dry gasses on the reference side) by providing a reference-pressure connection on housing 61, and suitable openings through the several mounting plates so the inner side of the diaphragm is exposed to the reference pressure.

The geometry of the sensing elements in transducer 10, while described above in terms of use in a pressure transducer, is equally applicable to transducers used for other kinds of measurements. For example, the sensing system is useful in an acceleration-measuring transducer where it is desired to measure very small acceleration changes at a relatively high level of ambient acceleration. This configuration would of course involve modification of the force-summing transducer diaphragm to a seismic mass which would produce linear deflection of the magnetic-pad mounting beam responsive to acceleration.

There has been described a novel transducer configuration having an unusually high output signal which enables the detection of minute variations in the parameter (pressure, acceleration, etc.) being measured when the parameter is at a high level approaching the full-scale capability of the instrument.

What is claimed is:

1. A variable-reluctance transducer, comprising:
    a housing;
    a force sensing element mounted on the housing, the element having a post extending therefrom to be movable with the element with respect to the housing responsive to variations in force applied to the element;
    a beam secured to the post and extending laterally therefrom with respect to an axis of movement of the post;
    a first pair of magnetic sensors secured to the housing and positioned on opposite sides of the beam, the sensors being laterally spaced from the axis;
    a second pair of magnetic sensors secured to the housing and positioned on opposite sides of the beam and laterally spaced from the axis, each sensor of the first and second pair being spaced from the beam by an air gap, the first and second pairs being on opposite sides of the axis;
    the sensors being connected in a four-active-arm Wheatstone bridge, and whereby movement of the beam varies the respective air gaps to vary sensor inductance and thereby to provide a high-level output signal.

2. The transducer defined in claim 1, and further comprising high-permeability pads secured to the beam and in face-to-face alignment with the respective magnetic sensors.

3. The transducer defined in claim 2 wherein each magnetic sensor comprises a high-permeability core, and a coil wound on the core, each coil forming one leg of the four-active-arm bridge.

4. A variable-reluctance pressure transducer, comprising:
    a housing;
    a deflectable force-summing diaphragm mounted at one end of the housing to be movable with respect to the housing responsive to pressure applied to a front surface of the diaphragm;
    two pairs of magnetic sensors, the pairs being spaced apart, and the sensors in each pair being spaced apart by a gap;
    a post secured to the diaphragm and extending rearwardly with respect to the diaphragm front surface and generally between the two pairs of sensors;
    a beam secured to the post and projecting laterally from opposite sides of the post to extend into the gap between each pair of sensors, so movement of the beam responsive to pressure-caused movement of the diaphragm and post varies spacing of the beam from each sensor to change magnetic-circuit reluctance of each sensor and thereby to vary inductance of each sensor.

* * * * *